United States Patent [19]
Kang et al.

[11] 4,051,309
[45] Sept. 27, 1977

[54] PROCESS FOR COPOLYMERIZING CONJUGATED DIENE AND ALPHA-OLEFIN

[75] Inventors: Jung Wong Kang, Clinton; James Oziomek, Akron, both of Ohio

[73] Assignee: The Firestone Tire & Rubber Company, Akron, Ohio

[21] Appl. No.: 769,745

[22] Filed: Feb. 17, 1977

Related U.S. Application Data

[63] Continuation-in-part of Ser. No. 627,983, Nov. 3, 1975, abandoned, which is a continuation-in-part of Ser. No. 509,525, Sept. 26, 1974, abandoned.

[51] Int. Cl.$^2$ ............................................ C08F 236/02
[52] U.S. Cl. .................................... 526/141; 526/142; 526/143; 526/339
[58] Field of Search ............... 526/139, 140, 141, 142, 526/143, 339

[56] References Cited

U.S. PATENT DOCUMENTS

| | | | |
|---|---|---|---|
| 3,380,981 | 4/1968 | Miller | 260/93.7 |
| 3,506,632 | 4/1970 | Henderson | 260/85.3 |
| 3,663,450 | 5/1972 | Cozewith | 526/140 |
| 3,838,137 | 9/1974 | Tang | 526/140 |
| 3,919,180 | 11/1975 | Furukawa | 526/140 |
| 3,953,410 | 4/1976 | Imai | 526/339 |

Primary Examiner—Paul R. Michl

[57] ABSTRACT

Conjugated dienes and alpha-olefins, such as butadiene and propylene, are copolymerized by a catalyst system comprising a metal component $TiCl_nBr_{4-n}$ or $VCl_mBr_{5-m}$, a reducing agent of the formula $AlR_2H$ wherein R is hydrogen or a hydrocarbon group, there being at least one hydrocarbon group per molecule, and a carbonyl-containing compound such as acetophenone. The use of the aluminum hydride compound allows the use of higher and more practical temperatures to obtain desirable molecular weights, yields and microstructure that with aluminum trialkyls require much lower and less practical polymerization temperatures.

13 Claims, No Drawings

PROCESS FOR COPOLYMERIZING CONJUGATED DIENE AND ALPHA-OLEFIN

This application is a continuation-in-part of application Ser. No. 627,983 filed Nov. 3, 1975, now abandoned, which in turn is a continuation-in-part of application Ser. No. 509,525 filed Sep. 26, 1974, now abandoned.

BACKGROUND OF THE INVENTION

1. Field of the Invention

This invention relates to the copolymerization of conjugated dienes, such as 1,3-butadiene, with alpha-olefins, such as propylene. More specifically this invention involves the copolymerization of conjugated dienes with alpha-olefins in the presence of a novel catalyst composition.

2. Related Prior Art

French Pat. No. 2,047,646 described the copolymerization of butadiene and propylene in the presence of a metal compound such as $TiCl_4$ and $AlR_3$ reducing agent in which R is hydrocarbon, and a carbonyl-containing compound. While the general discussion of the invention refers to liquid phase polymerization at temperatures in the range of $-100°$ C to $50°$ C, the preferred temperature is $-40°$ C to $-30°$ C which is confirmed by the fact that in patentee's 30 working examples, a polymerization temperature of $-30°C$ is used in 24 of these examples and $-40°$ C in four examples. It appears that these low polymerization temperatures are necessary to obtain patentee's optimum results in molecular weight, microstructure and other properties in their copolymers.

SUMMARY OF THE INVENTION

It has now been found that by the use of an aluminum hydride compound having the formula $R_2AlH$, wherein R is hydrogen or a hydrocarbon group with at least one hydrocarbon group being present, instead of aluminum trihydrocarbon as the reducing agent, in a catalyst composition using $TiCl_nBr_{4-n}$ or $VCl_mBr_{5-m}$ wherein $n$ has a value of 0 to 4 and $m$ has a value of 0 to 5, and a carbonyl-containing modifier (CO), such as acetophenone, it is possible to conduct the copolymerization of conjugated dienes and alpha-olefins at higher and more practical temperatures, without sacrificing the desired properties in the polymer products. In other words, with an aluminum hydride as the reducing component in the catalyst composition, it is possible to copolymerize these comonomers at $5°$ C to give copolymers having sufficiently high molecular weights and other desirable properties that with trihydrocarbon aluminum compounds as the reducing agent, polymerization temperatures of $-30°$ or lower are necessary to produce similar results in the copolymers. The resulting copolymers are predominantly alternate copolymers with minor amounts of block and random copolymerization occurring, depending on the proportions of diene and olefin used in the comonomer starting mixture.

As stated above, the reducing component is $R_2AlH$ wherein R is hydrogen or a hydrocarbon group of no more than 20 carbon atoms, preferably no more than 12, there being at least one hydrocarbon group persent. Alkyl groups of 1-8 carbon atoms are preferred in these compounds but even larger groups or aromatic or cycloaliphatic groups such as phenyl, tolyl, xylyl, napthhyl, cyclohexyl, cycloheptyl, etc., may also be present in place of the alkyl groups in the respective compounds.

Typical aluminum hydrides that may be used include: dimethyl aluminum hydride, diethyl aluminum hydride, dihexyl aluminum hydride, dipropyl aluminum hydride, diphenyl aluminum hydride, dicyclohexyl aluminum hydride, ethyl aluminum dihydride, butyl aluminum dihydride, amyl aluminum dihydride, octyl aluminum dihydride, phenyl aluminum dihydride, cycloheptyl aluminum dihydride and the like.

The titanium and vanadium halide components are represented by the formulas $TiBr_nCl_{4-n}$ and $VBr_mCl_{5-m}$ where $n$ has a value from 0 to 4 and $m$ has a value of 0 to 5. Preferably the titanium or vanadium is completely saturated with chloride. However, various degrees of substitution by bromine also give suitable results. Such compounds include $TiCl_4$, $VCl_5$, $TiBrCl_3$, $TiBr_2Cl_2$, $TiBr_3Cl$, $TiBr_4$, $VBrCl_4$, $VBr_2Cl_3$, $VBr_3Cl_2$, $VBr_4Cl$ and $VBr_5$.

Typical carbonyl compounds that may be used as the modifier in the catalyst composition of this invention are preferably ketones such as acetophenone, benzophenone, etc., but other carbonyl compounds may be used such as carbon dioxide, aldehydes, such as acetaldehyde, butyraldehyde, benzaldehyde, etc., carboxylic acids and their anhydrides, such as acetic acid, benzoic acid, butyric acid, cyclohexanoic acid, phthalic acids, the corresponding anhydrides of these acids, such as acetic anhydride, phthalic anhydride, etc.; the salts, esters and amides of such acids, such as Na acetate, ethyl acetate, ethyl benzoate, acetamide, N,N-dimethylacetamide, etc.; carbamates, such as ethyl carbamate, etc; ketones, such as diethylketone, methylethylketone, acetylacetone, etc., and preferably aromatic ketones, such as the aforementioned acetophenone and benzophenone and derivative thereof having alkyl, and ar-chloro substituent groups, such as p-chloroacetophenone, p-methylacetophenone, p,p'-dimethylbenzophenone, p,p'dichlorobenzophenone, p-chlorobenzophenone, phenylacetophenone, etc. These carbonyl compounds have no halogen atoms therein except that there may be chlorine attached directly to a carbon of an aromatic ring in such compounds, in which position the chlorine is relatively inactive. In other positions, such as adjacent to the carbonyl group, the halogen is more reactive and can interfere with the activity of the various catalyst components.

The molar ratio of aluminum to Ti or V in the catalyst composition is advantageously in the range of 1.0 to 4.0 moles per mole of Ti or V compound. The molar ratio of carbonyl compound to Ti or V is advantageously in the range of 0.7 to 4 moles, preferably 1-2 moles per mole of Ti or V compound.

The catalyst is used in a proportion of 0.1 to 4 millimoles per 100 grams of monomer. In referring to millimoles of catalyst, this corresponds to the millimoles of the titanium or vanadium compound since the catalyst is regarded or at least calculated as a complex of the titanium or vanadium compound with the other catalyst components.

Polymerization may be conducted at a temperature of $-50°$ to $50°$ C, but preferably at $0°-50°$ C. At temperatures of $0°$ to $50°$ C polymers are produced with yields generally of 50–80%, and molecular weights generally no higher than 500,000, preferably in the range of about 100,000 to 200,000. At these temperatures the polymerization rate is reasonably fast and very practical use is made of this catalyst. This is in contrast to prior art processes which require temperatures of −40° to 0° to obtain practical molecular weights.

The microsturcture of the butadiene portion of the copolymer is generally about 25–80% trans-1,4, about 15–65% cis-1,4 and about 3–10% 1,2. The copolymers have a high degree of alternate distribution of comonomer repeating units although there may also be some random and block copolymer formed, depending somewhat on the proportions of diene and oelfin used. The copolymers also have a low glass transition temperature −105° to −70° C, which is desirable for good tire properties.

Generally the molar ratio of olefin to diene in the copolymer product is lower than the corresponding molar ratio in the starting monomer mixture. Therefore, it is desirable to use a higher molar mixture of olefin to diene in the monomer mix in order to produce the desired molar proportion in the copolymer product.

The polymerization is advantageously effected in the presence of an inert diluent to facilitate handling of the polymer and to give better temperature control. Normally, liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either.

Conjugated dienes that may be copolymerized in accordance with this invention include: 1,3-butadiene, isoprene, chloroprene, 2-phenyl-1,3-butadiene, piperylene, etc.

The alpha-olefins that may be copolymerized with the conjugated diene include ethylene, propylene, n-butene-1, isobutylene, n-pentene-1, and other alpha-olefins having up to 10 carbon atoms, including aryl-substituted olefins, such as styrene, alphamethylstyrene, vinyl toluene, vinyl napthalene, etc.

In the comonomer mixture, the propylene or other olefin is used in an amount representing 10–90%, preferably 10–50% by weight of the total monomers. In the resultant copolymer, the proportion of olefin depends somewhat on the degree of conversion, but in most cases, is in the range of 5–90%, preferably 10–95%, olefin.

The rubbery copolymer of 1,3-butadiene and olefin produced by the present invention has processing properties and practical physical properties superior to those of rubber products obtained from natural rubber. It can be used for articles such as tire carcasses, tire treads, belting, industrial articles, sponge products and car accessories.

For the production of rubber products, the copolymer may be mixed with other rubbery materials such as natural rubber, butadiene-styrene rubber, polybutadiene rubber, polyisoprene rubber, chloroprene rubber, butadiene-acrylonitrile rubber, butadiene-methacrylate rubber and ethylene-propylene rubber in any desired proportion. It is effective for improving the processing properties and practical properties of such rubbery materials. Generally, such a rubber composition should contain at least 20% by weight of the copolymer of the present invention. Below 20%, there is little improvement in the processing properties and the physical properties of the cured rubber products.

The "dilute solution viscosity" referred to herein is defined as the inherent viscosity determined at 25° C on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF THE INVENTION

Most of the copolymerizations described below in the working examples are conducted in 28 oz. beverage bottles. These bottles are oven-dried overnight and then capped with crown, three-hole caps and rubber liners. The bottles are cooled and purged with a stream of nitrogen. After cooling, the bottles are charged, by means of a syringe needle inserted through the rubber liner of the cap, with the diene-olefin-diluent blend at 0° C, and the carbonyl modifier, metal compound and aluminum hydrocarbon hydride are charged in that order. The bottles are then placed in a constant temperature bath equipped with a device for agitating the bottles and retained therein for the desired reaction period. The copolymerization is terminated at the appropriate time by the addition of a methanolantioxidant solution and the copolymer product is coagulated by pouring the reaction mass into a large volume of methanol containing an antioxidant. The recovered polymer is dried and analyzed by means of infrared spectra.

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A series of copolymerizations are conducted in bottles according to the procedure described above, using a blend containing 9.9 butadiene, 6.3% propylene and 83.8% toluene (the propylene representing 38.9 of the monomer portion) with 2 millimoles of $TiCl_4$ used per 100 gms. of monomer, diisobutyl aluminum hydride in an amount to give an Al/Ti ratio of 3/1, a reaction termperature of 5° C, a reaction time of 60 hours, and the carbonyl compound is acetophenone with the amounts varied as shown below in the tabulated results:

TABLE I

| | A | B | C | D | E | F |
|---|---|---|---|---|---|---|
| Molar Ratio Co/Ti | 0.7 | 0.8 | 0.9 | 1.0 | 1.2 | 1.5 |
| Conversion (%) | 35.4 | 38.4 | 47.0 | 66.0 | 70.6 | 71.5 |
| IR Spectra | | | | | | |
| cis-1,4 (%) | 25.4* | 23.6 | 28.9 | 31.2 | 37.2 | 39.4 |
| | 35.8** | 33.6 | 41.8 | 44.5 | 51.6 | 52.0 |
| trans-1,4 (%) | 41.3 | 42.5 | 35.8 | 34.3 | 29.8 | 32.6 |
| | 58.1 | 60.6 | 51.7 | 48.8 | 41.7 | 42.9 |
| 1,2 (%) | 4.4 | 4.1 | 4.5 | 5.7 | 3.9 | 4.3 |

TABLE I-continued

|  | A | B | C | D | E | F |
|---|---|---|---|---|---|---|
|  | 6.1 | 5.8 | 6.5 | 6.7 | 5.1 | 6.2 |
| Wt. % Propylene | 29.0 | 29.8 | 30.8 | 29.8 | 28.4 | 24.1 |
| DSV | 2.25 | 1.22 | 1.44 | 2.00 | 2.68 | 3.30 |
| % Gel | 1.92 | 0.0 | 0.0 | 1.97 | 0.98 | 0.32 |
| Glass Transition Temp. (Tg) ° C | −78 | −82 | −81 | −82 | −82 | −85 −105(3:1) |

*The first values include the percent of propylene.
**The second values are based on only the butadiene portion of the copolymer.

EXAMPLE II

The procedure of Example I is repeated except that a reaction period of 20 hours is used instead of 60 hours. The results are tabulated below:

TABLE II

|  | A | B | C | D | E | F |
|---|---|---|---|---|---|---|
| Molar Ratio Co/Ti | 0.5 | 1.0 | 1.1 | 1.2 | 1.25 | 1.5 |
| Conversion (%) | 12.8 | 59.0 | 70.0 | 65.0 | 60.0 | 46.0 |
| IR Spectra |  |  |  |  |  |  |
| cis-1,4 (%) | 21.8 | 36.4 | 32.0 | 39.4 | 36.0 | 47.1 |
|  | 32.3 | 50.4 | 44.6 | 54.1 | 48.1 | 59.2 |
| trans-1,4 (%) | 40.1 | 31.0 | 35.8 | 29.4 | 33.7 | 27.8 |
|  | 61.0 | 43.0 | 50.0 | 40.3 | 45.2 | 34.9 |
| 1,2 (%) | 4.4 | 4.8 | 3.9 | 4.1 | 5.0 | 4.7 |
|  | 6.7 | 6.7 | 5.4 | 5.6 | 6.7 | 5.9 |
| Wt. % Propylene | 27.1 | 27.8 | 28.4 | 27.1 | 26.3 | 20.5 |
| DSV | 2.61 | 2.64 | 2.01 | 2.61 | 3.01 | 3.61 |
| % Gel | 0.0 | 0.0 | 1.64 | 0.0 | 0.0 | 0.0 |
| Tg (° C) | −72 | −83 | −83 | −83 | −86 | −86 |
|  | −86 | −100 |  | −105 | −105 | −104 |
|  | (1:1)* | (3:1) |  | (5:1) | (2:1) | (3:1) |

*There is approximately as much of the copolymer melting at −72 as at −86.

EXAMPLE III

The procedure of Example I is repeated three times using a polymerization temperature of 30° C instead of 5° C and a reaction time of 19 hours with the variations in catalyst proportions and results shown in the following table:

TABLE III

|  | A | B | C |
|---|---|---|---|
| Millimoles (mM) TiCl₄ per 100 gms of monomer (phgm) | 1.0 | 1.0 | 1.6 |
| mM Co/phgm | 1.0 | 1.0 | 1.6 |
| mM Al/phgm | 3.0 | 3.5 | 4.4 |
| Al/Ti | 3.0 | 3.5 | 3.75 |
| Conversion (%) | 49.0 | 29.0 | 63.0 |
| IR Spectra |  |  |  |
| cis-1,4 (%) | 21.1 | 22.9 | 24.8 |
|  | 28.5 | 29.3 | 33.6 |
| trans-1,4 (%) | 49.0 | 50.0 | 45.2 |
|  | 66.0 | 64.0 | 61.4 |
| 1,2 (%) | 4.1 | 5.3 | 3.7 |
|  | 5.5 | 6.7 | 5.0 |
| Wt. % propylene | 25.8 | 21.8 | 26.3 |
| DSV | 1.20 | 1.96 | 1.19 |
| Gel (%) | 0.0 | 0.0 | 0.0 |
| Tg (° C) | −80 | −101 | −104 |
|  | (1:1) | (1:1) | (4:1) |

EXAMPLE IV

The procedure of Example I is repeated twice using a polymerization temperature of 50° C instead of 5° C and a reaction time of 19 hours with the proportions of catalyst and results shown in the following table:

TABLE IV

|  | A | B |
|---|---|---|
| mM Ti/phgm | 1.0 | 1.0 |
| mM CO/phgm | 1.0 | 1.0 |
| mM Al/phgm | 3.0 | 3.5 |
| Al/Ti ratio | 3.0 | 3.5 |
| Conversion (%) | 43.2 | 45.0 |
| Ir Spectra |  |  |
| cis-1,4 (%) | 14.0 | 15.0 |
|  | 18.6 | 19.4 |
| trans-1,4 (%) | 57.3 | 58.3 |
|  | 76.0 | 75.0 |
| 1,2 (%) | 4.0 | 4.4 |
|  | 5.3 | 5.6 |
| Wt. % propylene | 24.7 | 22.3 |
| DSV | — | 0.55 |
| Gel (%) | — | 0.0 |
| Tg (° C) | — | — |

EXAMPLE V

The procedure of Example I is repeated twice using the same polymerization temperature of 5° C for 19 hours but varying the catalyst proportions as shown in the following table:

TABLE V

|  | A | B |
|---|---|---|
| mM Ti/phgm | 1.6 | 2.0 |
| mM Co/phgm | 1.6 | 2.0 |
| mM Al/phgm | 4.4 | 5.5 |
| Al/Ti ratio | 2.75 | 2.75 |
| Conversion (%) | 41.0 | 51.0 |
| IR Spectra |  |  |
| cis-1,4 (%) | 36.3 | 46.1 |
|  | 47.2 | 61.2 |
| trans-1,4 (%) | 35.8 | 24.6 |
|  | 46.6 | 32.7 |
| 1,2 (%) | 4.8 | 4.6 |
|  | 6.2 | 6.1 |
| Wt % propylene | 23.1 | 24.7 |
| DSV | 2.54 | 2.32 |
| Gel (%) | 0.0 | — |
| Tg (° C) | −86 | −86 |
|  | −101 | −104 |
|  | (3:1) | (5:1) |

EXAMPLE VI

The procedure of Example I is repeated three times using the same reaction temperature of 5° C with the proportions of catalyst and other variations as noted with the results of the following table:

TABLE VI

|  | A | B | C |
|---|---|---|---|
| mM Ti/phgm | 2.0 | 2.0 | 2.0 |
| mM CO/phgm | 2.0 | 2.0 | 2.0 |
| mM Al/phgm | 6.0 | 6.0 | 6.0 |
| Al/Ti ratio | 3.0 | 3.0 | 3.0 |
| Reaction Time (hrs) | 60 | 20 | 20 |
| Conversion (%) | 76 | 75 | 71 |
| IR Spectra |  |  |  |
| Cis-1,4 (%) | 28.6 | 34.0 | 33.5 |
|  | 39.4 | 47.6 | 47.8 |
| trans-1,4 (%) | 39.5 | 32.8 | 32.4 |
|  | 54.5 | 46.0 | 46.2 |
| 1,2 (%) | 4.4 | 4.6 | 4.2 |
|  | 6.1 | 6.4 | 6.0 |
| Wt. % propylene | 27.5 | 28.5 | 29.9 |
| DSV | 2.51 | 2.41 | 1.86 |
| Gel (%) | 0.0 | 0.0 | 1.45 |
| Tg (° C) | −84 | −83 | −82 |
|  |  |  | −105 |

EXAMPLE VII

A series of copolymerizations using the same monomer blend and catalyst components as in Example I are conducted in a one-gallon stainless steel reactor equipped with a temperature controlling device, a stirrer and sampling exit ports. The product is withdrawn directly into an isopropanol-antioxidant solution and the precipitated polymer is drum-dried and analyzed. The conditions for polymerization and the results are given in Table VII.

TABLE VII

|  | A | B | C | D | E | F |
|---|---|---|---|---|---|---|
| mM Ti/phgm | 2.0 | 2.0 | 2.0 | 2.0 | 2.0 | 2.4 |
| mM Co/phgm | 2.0 | 2.0 | 3.0 | 3.0 | 3.0 | 3.6 |
| mM Al/phgm | 6.0 | 6.0 | 6.0 | 6.0 | 6.0 | 7.2 |
| Al/Ti ratio | 3/1 | 3/1 | 3/1 | 3/1 | 3/1 | 3/1 |
| Reaction Time (hrs.) | 21 | 22 | 20 | 20 | 24 | 22 |
| Polymer. Temp. (° C) | 2–5 | 2–5 | 9–10 | 9–10 | 27–31 | 1–4 |
| Conversion (%) | 40.3 | 45.0 | 30.0 | 46.0 | 60.0 | 43.0 |
| IR Spectra |  |  |  |  |  |  |
| cis-1,4 (%) | 28.6 | 28.5 | 42.9 | 30.9 | 30.5 | 31.2 |
|  | 41.0 | 40.2 | 53.0 | 41.2 | 44.3 | 43.8 |
| trans-1,4 (%) | 47.1 | 38.1 | 34.0 | 39.6 | 34.2 | 35.1 |
|  | 53.0 | 53.7 | 42.0 | 52.8 | 49.5 | 49.4 |
| 1,2 (%) | 4.2 | 4.4 | 4.0 | 4.5 | 4.3 | 4.8 |
|  | 6.0 | 6.1 | 5.0 | 6.0 | 6.2 | 6.8 |
| Propylene (Wt. %) | 30.1 | 29.0 | 19.0 | 25.0 | 30.9 | 28.9 |
| DSV | 2.04 | 1.98 | 3.71 | 2.75 | 1.39 | 2.41 |
| Gel (%) | 0.0 | 0.0 | 0.1 | 0.0 | 0.9 | 0.0 |
| Tg (° C) | −83 | −83 | −87 | −85 | −78 | −87 |
|  |  |  | −105 (2.5:1) | −104 (5:1) |  |  |
| ML$_4$/212° F | 43 | 44 | 101 | 73 | — | 70 |

EXAMPLE VIII

The procedure of Example VII is repeated for a series of copolymerizations with a higher proportion of TiCl$_4$ as noted together with the results in the following table:

TABLE VIII

|  | A | B | C | D | E | F |
|---|---|---|---|---|---|---|
| mM Ti/phgm | 3 | 3 | 3 | 3 | 3 | 3 |
| mM Co/phgm | 4.5 | 4.5 | 4.5 | 4.5 | 4.5 | 4.5 |
| mM Al/phgm | 9.0 | 9.0 | 9.0 | 9.0 | 9.0 | 9.0 |
| Al/Ti ratio | 3/1 | 3/1 | 3/1 | 3/1 | 3/1 | 3/1 |
| Reac. Time (hrs.) | 22 | 24 | 24 | 24 | 24 | 23 |
| Polym. Temp. (° C) | 1–5 | 1–5 | 1–7 | 2–1 | 2–4 | 2–5 |
| Conversion (%) | 74 | 52 | 71.7 | 57.0 | 60.0 | 51 |
| IR Spectra |  |  |  |  |  |  |
| cis-1,4 (%) | 33.6 | 35.7 | 38.2 | 35.1 | 32.1 | 35.1 |
|  | 47.7 | 49.7 | 54.0 | 49.7 | 45.9 | 47.7 |
| Trans-1,4 (%) | 32.0 | 31.3 | 28.0 | 30.7 | 32.9 | 33.3 |
|  | 45.5 | 43.5 | 39.5 | 43.5 | 47.2 | 45.3 |
| 1,2 (%) | 4.7 | 4.9 | 4.6 | 4.8 | 4.8 | 5.2 |
|  | 6.9 | 4.8 | 6.5 | 6.7 | 6.8 | 7.0 |
| Propylene (Wt. %) | 29.6 | 28.0 | 29.2 | 29.4 | 30.2 | 26.4 |
| DSV | 2.16 | 2.74 | 2.47 | 2.15 | 2.18 | 3.51 |
| Gel (%) | 0.0 | 1.67 | 6.73 | 0.0 | 0.0 | 0.0 |
| Tg (° C) | −82 | −88 | −82 | −88 | −85 | −86 |
|  |  |  |  |  |  | −105 (3:1) |
| ML$_4$212° F | 65 | 79.5 | 85 | 61 | 61 | 117 |
| Wms Recovery | 3.06 | 3.53 | 4.71 | 2.71 | 3.21 | 3.60 |

EXAMPLE IX

The procedure of Example I is repeated three times using p-chloroacetophenone in place of acetophenone with variations in the amounts of carbonyl catalyst component and with the results shown in the following table:

TABLE IX

|  | A | B | C |
|---|---|---|---|
| mM Ti/phgm | 2 | 2 | 2 |
| mM CO/phgm | 1.5 | 2.0 | 2.4 |
| mM Al/phgm | 6 | 6 | 6 |
| Al/Ti ratio | 3/1 | 3/1 | 3/1 |
| Reaction Time (hrs) | 20 | 20 | 20 |
| Polymer. Temp. (° C) | 5 | 5 | 5 |
| Conversion (%) | 45 | 59 | 61.2 |
| IR Spectra |  |  |  |
| cis-1,4 (%) | 24.8 | 35.0 | 34.2 |
|  | 35.1 | 51.3 | 47.5 |
| trans-1,4 (%) | 41.5 | 28.0 | 33.2 |
|  | 58.6 | 41.0 | 46.0 |
| 1,2 (%) | 4.5 | 5.2 | 4.6 |
|  | 6.4 | 7.7 | 6.4 |
| Propylene (Wt. %) | 29.2 | 31.8 | 28.1 |
| DSV | 1.48 | 1.86 | 2.46 |
| Gel (%) | 0.0 | 0.0 | 0.0 |
| Tg (° C) | −86 | −84 | −85 |

The percent conversion appears to increase under these conditions, with increase in the proportion of carbonyl compound.

EXAMPLE X

The procedure of Example IX is repeated using slightly longer reaction time which increases the yield with the lower amounts of carbonyl but decreases the yield with the largest amount of carbonyl. The results are tabulated below:

TABLE X

|  | A | B | C |
|---|---|---|---|
| mM Ti/phgm | 2 | 2 | 2 |
| mM Co/phgm | 2.0 | 2.0 | 3.0 |
| mM Al/phgm | 6 | 6 | 6 |
| Al/Ti ratio | 3/1 | 3/1 | 3/1 |
| Reaction Time (hrs) | 23 | 23 | 23 |
| Polymer. Temp. (° C) | 5 | 5 | 5 |
| Conversion (%) | 62 | 64 | 45 |
| IR Spectra |  |  |  |
| cis-1,4 (%) | 48.3 | 43.5 | 52.1 |
|  | 62.3 | 56.7 | 64.9 |
| trans-1,4 (%) | 24.8 | 29.1 | 24.1 |
|  | 32.1 | 37.8 | 30.0 |
| 1,2 (%) | 4.3 | 4.2 | 4.1 |
|  | 5.6 | 5.5 | 5.1 |
| Propylene (Wt. %) | 22.6 | 23.2 | 19.7 |
| DSV | 3.13 | 3.21 | 3.47 |
| Gel (%) | 0.0 | 0.0 | 0.0 |
| Tg (° C) | −87 | −86 | −86 |
|  |  |  | −102 (2:1) |

It appears also that the longer reaction time in this case as compared to example IX, gives a higher proportion of cis-1,4 and a lower proportion of trans-1,4, as well as higher molecular weights.

EXAMPLE XI

The procedure of Example I is repeated four times using, in each case, a monomer blend containing 12.98% butadiene, 8.64% propylene and 78.38% toluene, with the other conditions being identical to those in Example I except for any variations shown below in the table of conditions and results.

TABLE XI

| Run No. |  | 1 | 2 | 3 | 4 |
|---|---|---|---|---|---|
| $TiCl_4$ | (millimoles) | 1 | 1 | 1 | 1 |
| $AlH_3 \cdot N(CH_3)_3$ | (millimoles) | 3 | 3 | 3 | 0 |
| $C_6H_5C(O)CH_3$ | (millimoles) | 0 | 0 | 1 | 1 |
| $AlH(i-Bu)_2$ | (millimoles) | 0 | 0 | 0 | 3 |
| Polym. Temp. | (° C) | 5 | 5 | 5 | 5 |
| Time | (hrs) | 24 | 24 | 24 | 24 |
| Conversion | (%) | 37 | 40 | 0 | 60 |
| Analytical Results |  |  |  |  |  |
| cis-1,4 | (%) | 82.2 | 84.5 | — | 29.0 |
| trans-1,4 | (%) | 15 | 15.2 | — | 39.8 |
| 1,2 | (%) | 2 | 0.3 | — | 4.3 |
| Propylene | (%) | 0 | 0 | — | 28.5 |
| Glass Trans.Temp. | (° C) | −98 | −101 | — | −82 |
| DSV |  | 2.05 | 2.13 | — | 1.85 |
| Gel | (%) | 0 | 0 | — | 0 |

In Runs Nos. 1 and 2 of Example XI where $AlH_3 \cdot N(CH_3)_3$ is used with $TiCl_4$, but without $C_6H_5C(O)CH_3$, only homopolymer is produced, with conversions of 37 and 40 percent, respectively, When $C_6H_5C(O)CH_3$ is used together with the above catalyst components, as shown in run No. 3, there is no polymerization effected. Apparently the $AlH_3 \cdot N(CH_3)_3$ and $C_6H_5C(O)CH_3$ interreact and destroy the catalytic activity either might have with $TiCl_4$.

In contrast, as shown in run No. 4, when diisobutyl aluminum hydride is used together with the $TiCl_4$ and $C_6H_5C(O)CH_3$, propylene copolymerization is effected to give 28.5% propylene in the copolymer and a total conversion of 60%.

EXAMPLE XII

The procedure of Example IX is repeated with the monomer mix comprising butadiene, propylene, toluene porportions of 6:9:85. The CO/Ti/Al proportions are 2:2:6 mM/phgm. Similar results are obtained, with the polymer product containing 40% propylene.

EXAMPLE XIII

The procedure of Example II is repeated a number of times with similar results using in place of the propylene equivalent amounts respectively of n-butene-1, n-pentene-1, n-hexene-1 and styrene, and using Co/Ti/Al proportions of 2:2:6 mM/phgm.

EXAMPLE XIV

The procedures of Examples I and XII are repeated with similar results using in place of butadiene equivalent amounts of isoprene.

EXAMPLE XV

The procedure of Example XII is repeated four times with similar results using in place of $TiCl_4$ an equivalent amount respectively of:
 a. $TiCl_2Br_2$
 b. $TiCl_3Br$
 c. $TiClBr_3$
 d. $TiBr_4$

EXAMPLE XVI

The procedure of Example I is repeated a number of times with satisfactory results using in place of diisobutyl aluminum hydride an equivalent amount respectively of:
 a. Diethyl aluminum hydride
 b. Isobutyl aluminum dihydride
 c. Phenyl aluminum dihydride
 d. Cyclohexyl aluminum dihydride
 e. Hexyl aluminum dihydride

EXAMPLE XVII

The procedure of Example I is repeated a number of times with satisfactory results using in place of the acetophenone an equivalent amount respectively of:
 a. Benzophenone
 b. Benzaldehyde
 c. Ethyl acetoacetate
 d. Ethyl benzoate
 e. Diethyl ketone
 f. Acetyl acetone g. Caprolactam
h. N,N-Dimethyl acetamide
i. Benzoic acid
j. N-Ethyl-ethyl carbamate

EXAMPLE XVIII

The procedure of Example XII is repeated three times with similar results using in place of the $TiCl_4$ an equivalent amount respectively of $VCl_5$, $VCl_3Br_2$ and $VBr_5$.

Notable results in copolymer formation are observed after a reaction period of one hour. However, it is generally desirable to extend to the reaction period to 10-30 hours to obtain the most efficient yields. Generally, however, while longer reaction periods may be used, they produce little or no greater advantage.

As indicated above, ketones are the preferred modifiers for the catalyst compositions used in the practice of this invention. The ketones may be defined by the formula $R_aC(O)R_b$ wherein $R_a$ and $R_b$ are hydrocarbon groups of 1-12 carbon atoms and derivatives thereof in which the derivative groups may be a second keto group, an aldehyde group, acyloxy group, acyl group, or chlorine atom. Preferably, the $R_a$ and $R_b$ groups are hydrocarbon, such as aliphatic, aromatic and cyaliphatic hydrocarbon groups, preferably free of ethylenic and acetylenic unsaturation, and advantageously the total number of carbon atoms in the ketone does not exceed 24. Typical ketone compounds suitable for this purpose include, in addition to those illustrated in the above working examples: p-methyl-acetophenone, p-ethyl-benzophenone, dibutyl ketone, beta-acetoxy-diethyl ketone, beta-acyl dipropyl ketone, cyclohexanone, p-methyl cyclohexanone, dicyclohexyl ketone, p-cl-benzophenone, propionophenone, and the like.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A process for the hydrocarbon solution polymerization of a monomer composition containing 10-90 percent by weight of a conjugated diene and 10-90 percent by weight of an alpha-olefin having 2-10 carbon atoms to produce a copolymer having 5-90 percent of the alpha-olefin in the resultant copolymer comprising the steps of maintaining said monomer composition at a temperature in the range of −30° to 50° C in intimate contact with a catalyst composition consisting essentially of:
   a. an aluminum hydride of the formula $R_2AlH$ where R is hydrogen or a hydrocarbon radical of 1-20 carbon atoms, there being at least one hydrocarbon radical per molecule;
   b. a metal halide compound having the formula $TiBr_nCl_{4-n}$ or $VBr_mCl_{5-m}$ wherein $n$ has a value of 0-4 and $m$ has a value of 0-5; and
   c. a carbonyl-containing compound having no more than 20 carbon atoms selected from the class consisting of aldehydes, ketones and carboxylic acids, esters, amides and carbamates; said carbonyl-containing compound having no halogen atoms therein except that there may be a chlorine attached directly to a carbon of an aromatic ring in said compound;

the concentration of said titanium or vanadium halide being 0.1-4 millimoles per 100 grams of said monomer composition, said aluminum hydride being present in a proportion of 1-4 moles per mole of titanium or vanadium halide, and said carbonyl compound being present in a proportion of 0.7-4 moles per mole of titanium or vanadium halide, said polymerization being conducted for a period of at least one hour.

2. The process of claim 1 in which said diene is butadiene.

3. The process of claim 2 in which said alpha-olefin is propylene.

4. The process of claim 3 in which the ratio of said aluminum hydrocarbon hydride is about 2-3 moles per mole of said halide.

5. The process of claim 4 in which said halide is a titanium halide.

6. The process of claim 4 in which said halide is titanium tetrachloride.

7. The process of claim 6 in which said aluminum hydrocarbon hydride is a dialkyl aluminum hydride.

8. The process of claim 6 in which said hydride is diisobutyl aluminum hydride.

9. The process of claim 6 in which said carbonyl compound is a ketone.

10. The process of claim 6 in which said carbonyl compound is acetophenone.

11. The process of claim 9 in which said temperature is 0°-50° C.

12. The process of claim 11 in which said monomer composition is 10-50 percent by weight propylene.

13. The process of claim 12 in which said carbonyl compound is used in a proportion of 1-2 moles per mole of said halide.

* * * * *

UNITED STATES PATENT OFFICE
CERTIFICATE OF CORRECTION

Patent No. 4,051,309           Dated September 27, 1977

Inventor(s) Jung Wong Kang and James Oziomek

It is certified that error appears in the above-identified patent and that said Letters Patent are hereby corrected as shown below:

Column 1, line 22, the formula $AIR_3$ should read -- $AlR_3$ --

Column 1, line 65, persent should read -- present --

Column 5, Example II in Table II, under the heading E the second number from the bottom -105 should read -- -104 --

Column 8, Example VIII in Table VIII, under the heading E the seventh number down from the top, 60.0 should read -- 60.5 --

Signed and Sealed this

Eighteenth Day of April 1978

[SEAL]

Attest:

RUTH C. MASON
Attesting Officer

LUTRELLE F. PARKER
Acting Commissioner of Patents and Trademarks